(12) United States Patent
Eisenhour

(10) Patent No.: US 9,428,035 B2
(45) Date of Patent: Aug. 30, 2016

(54) VEHICLE HVAC NOISE CONTROL SYSTEM

(71) Applicant: Nissan North America, Inc., Franklin, TN (US)

(72) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 327 days.

(21) Appl. No.: 14/177,998

(22) Filed: Feb. 11, 2014

(65) Prior Publication Data

US 2015/0224848 A1 Aug. 13, 2015

(51) Int. Cl.
*B60H 1/00* (2006.01)

(52) U.S. Cl.
CPC ........ *B60H 1/0075* (2013.01); *B60H 1/00757* (2013.01); *B60H 1/00828* (2013.01); *B60H 1/00964* (2013.01); *B60H 2001/006* (2013.01)

(58) Field of Classification Search
CPC ............ B60H 1/0075; B60H 1/00757; B60H 1/00792; B60H 1/00828; B60H 1/00964; B60H 2001/006
See application file for complete search history.

(56) References Cited

U.S. PATENT DOCUMENTS

| | | | | |
|---|---|---|---|---|
| 4,498,309 A * | 2/1985 | Kobayashi | ......... | B60H 1/00828 165/43 |
| 5,547,125 A * | 8/1996 | Hennessee | ......... | B60H 1/00735 236/49.3 |
| 5,832,990 A | 11/1998 | Eisenhour | | |
| 5,995,889 A | 11/1999 | Eisenhour | | |
| 6,782,945 B1 | 8/2004 | Eisenhour | | |
| 8,260,495 B2 * | 9/2012 | Pfau | ................... | B60H 1/00764 381/71.4 |
| 8,350,683 B2 | 1/2013 | DeLine et al. | | |
| 2008/0147270 A1 | 6/2008 | Sakane et al. | | |
| 2010/0028134 A1 | 2/2010 | Slapak et al. | | |
| 2010/0241308 A1 * | 9/2010 | Kikuchi | ............. | B60H 1/00278 701/36 |
| 2011/0146320 A1 | 6/2011 | Tomiyama et al. | | |
| 2011/0308883 A1 | 12/2011 | Eaton et al. | | |

* cited by examiner

*Primary Examiner* — Jonathan Bradford
(74) *Attorney, Agent, or Firm* — Global IP Counselors, LLP

(57) ABSTRACT

A vehicle HVAC noise control system includes a controller. An air handler provides airflow to a passenger compartment. An inputting device sets a target temperature for the passenger compartment. A temperature sensor measures a current temperature within the passenger compartment. A sensor detects an ambient condition outside of the passenger compartment. A blower motor moves the air flowing through the air handler into the passenger compartment at an adjustable operating airflow rate. The controller is connected to the air handler, the inputting device, the temperature sensor, the exterior sensor, and the blower motor. The controller determines and implements adjustments to the operating airflow rate in order to reduce airflow noise level based on at least the ambient condition, a comparison between the target temperature and the current temperature within the passenger compartment and a noise level of the airflow in the passenger compartment.

17 Claims, 8 Drawing Sheets

VEHICLE HVAC NOISE CONTROL SYSTEM

BACKGROUND

1. Field of the Invention

The present invention generally relates to a vehicle HVAC noise control system. More specifically, the present invention relates to an HVAC system that controls the rate of airflow into a passenger compartment of a vehicle, in order to reduce noise generated by the airflow.

2. Background Information

Heating, ventilation and air conditioning systems (hereinafter HVAC systems) within passenger vehicles typically include a blower motor that operates at one of a plurality of pre-set speeds selected by a passenger within the passenger compartment. Such a blower motor arrangement provides a corresponding plurality of fixed airflow rates of air moving from an air handler into a passenger compartment of the passenger vehicle. Each airflow rate produces a corresponding level of noise as the air moves into the passenger compartment.

Some vehicle HVAC systems include controllers that reduce the airflow rate in response to the measured temperature within a passenger compartment approaching and/or being equal to a target temperature desired by passengers within the vehicle. These controllers adjust the airflow rate based on the changes in the measured temperature within the passenger compartment with consideration given to the presence or absence of sunlight and outside temperature.

SUMMARY

One object of the disclosure is to provide an HVAC system with a controller that changes an airflow rate of a blower in order to control a level of noise generated by the airflow.

In view of the state of the known technology, one aspect of the disclosure is to provide a vehicle HVAC noise control system that includes an air handler, an inputting device, a temperature sensor, at least one exterior sensor, a blower motor and a controller. The air handler provides airflow to a passenger compartment and includes a heating source and a cooling source. The inputting device sets a target temperature for the passenger compartment. The temperature sensor measures a current temperature within the passenger compartment. The exterior sensor detects an ambient condition outside of the passenger compartment. The blower motor is operably connected to the air handler moving the air flowing through the air handler into the passenger compartment at an adjustable operating airflow rate. The controller is operatively connected to the air handler, the inputting device, the temperature sensor, the exterior sensor, and the blower motor. The controller determines and implements adjustments to the operating airflow rate in order to reduce airflow noise level based on at least the ambient condition detected outside of the passenger compartment, and a comparison between the target temperature and the current temperature within the passenger compartment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
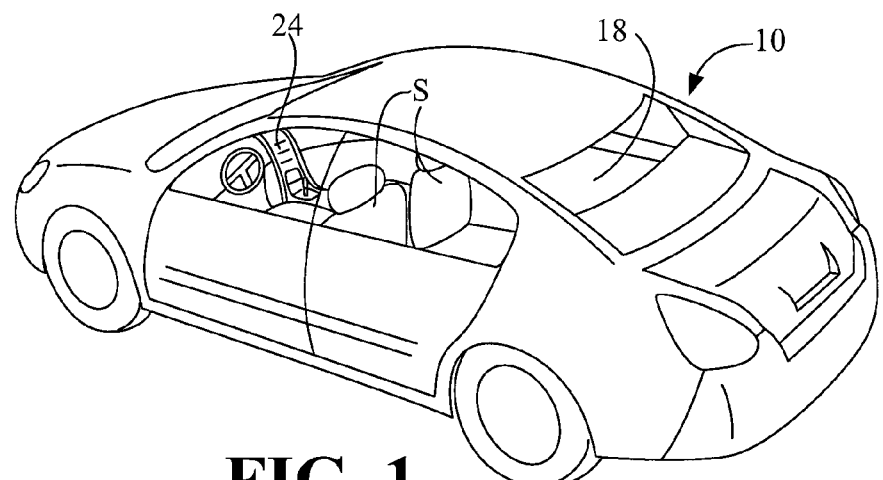
FIG. 1 is a perspective view of a vehicle having a passenger compartment and an HVAC system that includes a controller that operates a blower motor to control noise produced by airflow into the passenger compartment in accordance with one embodiment.
Figure 2:
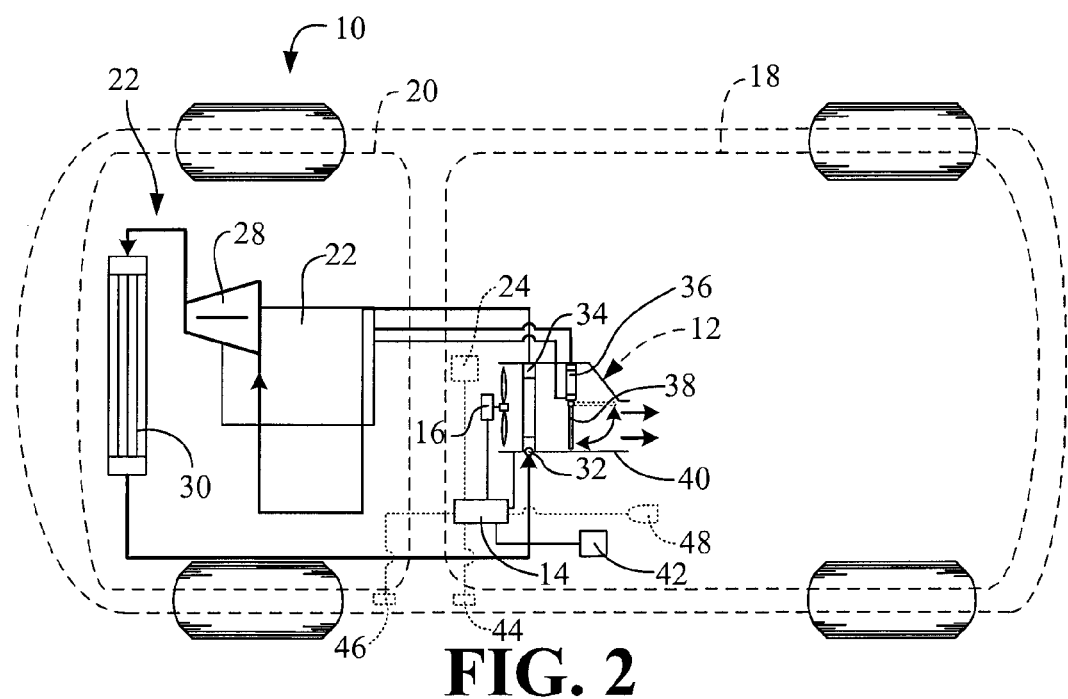
FIG. 2 is a schematic view of the vehicle showing the elements of the HVAC system that includes the controller and the blower motor in accordance with the one embodiment.

Referring initially to FIG. 1, a vehicle 10 is illustrated in accordance with a first embodiment. As best shown in FIG. 2, the vehicle 10 includes an HVAC system 12 (heating, ventilation and air conditioning) with a controller 14 that controls speed of a blower 16. More specifically, the controller 14 is configured to control the speed of the blower 16 in order to change an airflow rate of air flowing into a passenger compartment 18 of the vehicle 10. The controller 14 operates the HVAC system 12 in at least two different modes of operation, an automatic mode configured to achieve a target temperature as quickly as possible and a noise reducing mode in order to reduce noise produced by airflow, as is described in greater detail below.

A brief description of the vehicle 10 is first provided with specific reference to FIGS. 1 and 2. The vehicle 10 includes, among other things, the passenger compartment 18, an engine compartment 20, a propulsion system 22 and the HVAC system 12.

As shown in FIG. 1, the passenger compartment 18 includes seats S, an instrument panel 24 with operator controls, and other conventional features such as a steering wheel, accelerator controls and brake controls. The operator controls of the instrument panel 24 include, for example, climate controls (not shown) for engaging and disengaging the HVAC system 12 (heating, cooling and ventilation within the passenger compartment 18). The climate controls of the instrument panel 24 can also include, among other things, a temperature setting feature, a manual blower speed setting feature and a button (not shown) that engages the controller 14 to operate in an automatic mode. The temperature setting feature allows a passenger or operator to manually input or set a desired temperature for the passenger compartment 18 and manually input a desired airflow rate for the blower 16 by setting a blower motor speed. Such operator controls are conventional features, and therefore further description is omitted for the sake of brevity.

The HVAC system 12 can operate in various sub-operating modes, such as a start-up mode where stale air and moisture is purged from the HVAC system 12, a full recirculation mode, a full fresh air mode or a blending mode. The full recirculation mode is a mode where all air flowing through the HVAC system 12 is recirculated from the passenger compartment 18, through the HVAC system 12 and back into the passenger compartment 18. The full fresh air mode is a mode where all air passing through the HVAC system 12 and into the passenger compartment 18 is fresh air. The blending mode is preferably a mode where limited amount of fresh air is mixed with recirculated air prior to being fed into the passenger compartment 18. The HVAC system 12 can also include operate in a delay mode, where operation of the blower 16 is kept at a minimal speed (a reduced airflow rate) in response to cold outside temperatures until the propulsion system 18 has warmed up sufficiently to provide heat. The HVAC system 12 also operates to provide cooled air to the passenger compartment 18 in order to reduce the temperature with the passenger compartment 18 and/or operate to provide heated air to the passenger compartment 18 to increase the temperature within the passenger compartment 18 based on the temperature set by the operator or passenger. Since the full recirculation mode, the full fresh air mode and the blending mode are conventional modes of operation, further description is omitted for the sake of brevity.

The HVAC system 12 described hereinbelow, is basically an automatic mode in that the speed of the blower 16 is automatically adjusted under the circumstances described hereinbelow. However, it should be understood from the drawings and the description herein that a passenger or operator can end the automatic mode by, for example, manually setting a speed for the blower 16 using the climate controls of the instrument panel 24.

As shown in FIG. 2, the propulsion system 22 is located within the engine compartment 20 and can be an internal combustion engine, an electric motor or a hybrid motor system. The HVAC system 12 includes the controller 14, the blower 16, a compressor 28, a condenser 30, an expansion valve 32, an evaporator 34, a heat exchanger 36 and a mixing door 38. Typically, the compressor 28 and the condenser 30 are located in the engine compartment 20 and the expansion valve 32, the evaporator 34, the heat exchanger 36 and the mixing door being located within an air handler 40 within the passenger compartment 18. However, it should be understood from the drawings and the description herein that the expansion valve 32 and the evaporator 34 can also be located within the engine compartment 20. Hence, the evaporator 34 is a cooling source within the air handler 40.

The compressor 28, the condenser 30, the expansion valve 32 and the evaporator 34 define a cooling or air conditioning section of the HVAC system 12, and are basically conventional components. Therefore, further description is omitted for the sake of brevity. The heat exchanger 36 is a heat source for the HVAC system 12. In the embodiment where the propulsion system 22 is an internal combustion engine, the heat exchanger 36 is provided with heated engine coolant from the engine. However, it should be understood from the description herein and the drawings that in the embodiment where the propulsion system 22 includes an electric motor or is hybrid power plant, the heat exchanger 36 can be an electric heater or other non-coolant based source of heat for the HVAC system 12. The heat exchanger 36 defines a heating source of the HVAC system 12. Therefore, further description is omitted for the sake of brevity.

The mixing door 38 is an air diverting door that moves between a heating position (solid lines in FIG. 2) and a cooling position (dashed lines in FIG. 2) directing the flow of air through the air handler 40. Specifically, when the HVAC system 12 is required to provide heat to the passenger compartment 18, the mixing door 38 is moved by a signal from the controller 14 to the heating position, forcing air flowing through the air handler 40 to pass through the heat exchanger 36. When the HVAC system 12 is required to cool the passenger compartment 18, the mixing door 38 is moved by a signal from the controller 14 to the cooling position, forcing air flowing through the air handler 40 by-passing the heat exchanger 36. In the depicted embodiment, the blower 16 moves all air flowing through the air handler 40 through the evaporator 34. Control of the mixing door 38 is a conventional operation that is determined by the controller 14 using conventional logic. Since such logic is conventional, further description is omitted for the sake of brevity.

In FIG. 2, the air handler 40 is depicted as being located within the passenger compartment 18. However, the air handler 40 is preferably concealed beneath the instrument panel 24. The air handler 40 includes a plurality of ducts and outlets (not shown) that direct airflow to various locations in the passenger compartment 18 in a conventional manner. However, it should be understood from the drawings and the description herein that the air handler 40 can also be located partially or entirely within the engine compartment 20 with ducts directing airflow to and from the passenger compartment 18.

The controller 14 is additionally connected to a temperature sensor 42, an optional ambient temperature sensor 44, an optional sunlight sensor 46 and an optional noise level detector or microphone 48. In the depicted embodiment, the HVAC system 12 includes both the optional ambient temperature sensor 44 and the optional sunlight sensor 46. However, alternatively, the HVAC system 12 can include at least one of the optional ambient temperature sensor 44 and the optional sunlight sensor 46.

The temperature sensor 42 is located within the passenger compartment 18 and measures the current temperature within the passenger compartment 18. The temperature sensor 42 continuously provides signals to the controller 14 indicating the current temperature within the passenger compartment 18. The ambient temperature sensor 44 is an optional feature that is not required for basic operation of the controller 14, but when included, provides additional information to the controller 14. Specifically, if included, the ambient temperature sensor 44 is located outside the passenger compartment 18 and provides the controller 14 with the current ambient temperature outside the vehicle 10.

The sunlight sensor 46 is an optional feature that is not required for basic operation of the controller 14, but when included, provides additional information to the controller 14. Specifically, if included, the sunlight sensor 46 can be installed at any of a number of locations around the vehicle 10, such as on the vehicle body outside the passenger compartment 18, or on the dashboard within the passenger compartment 18 where the intensity of light can be measured. More specifically, the sunlight sensor 46 at least provides the controller 14 with an indication of the presence of sunlight. The sunlight sensor 46 can be a simple light detector sending a signal to the controller 14 indicating that it is daytime or that it is night time. Alternatively, the sunlight sensor 46 can detect the intensity of sunlight, when detecting the presence of sunlight. For example, the sunlight sensor 16 can detect the difference between low intensity sunlight (early morning, late evening or cloudy day sunlight) and a more intense mid-day sunlight, and send a corresponding set of signals to the controller 14.

The microphone 48 is an optional feature that is not required for basic operation of the controller 14, but when included, provides additional information to the controller 14. Specifically, if included, the microphone 48 is located within the passenger compartment 18 and provides the controller 14 with an indication of the noise level within the passenger compartment 18, where the noise detected is primarily generated by airflow from the air handler 40.

A description of the operations of the controller 14 of the HVAC system 12 is provided below after description of conditions related to the operation of the controller 14.

Figure 3:
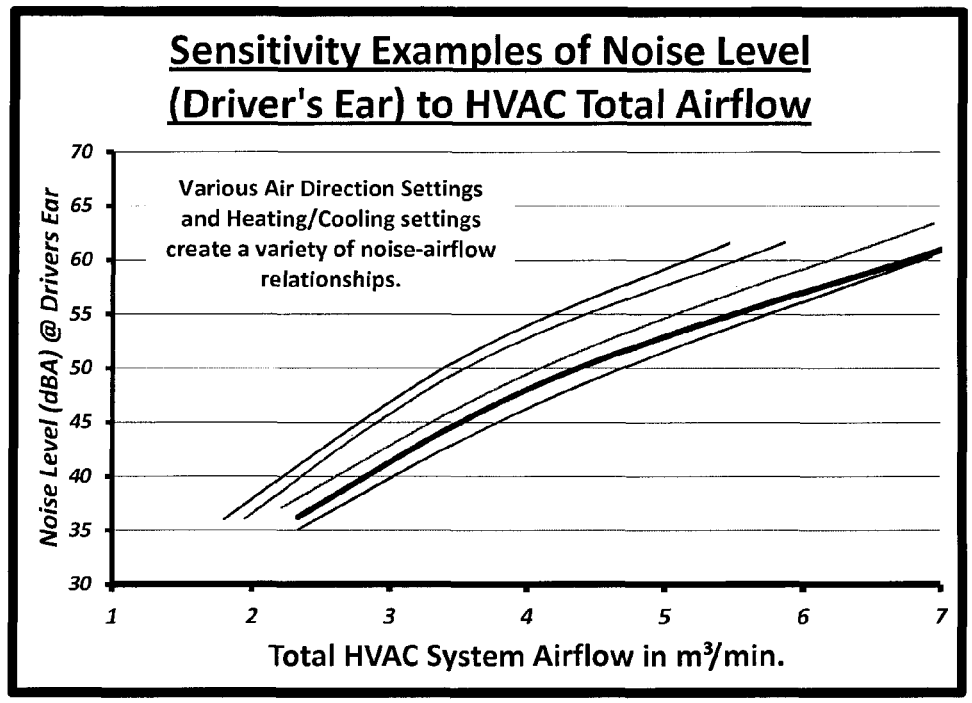
FIG. 3 is a chart that shows sound levels measured in a plurality of air distribution settings at a plurality of airflow rates, where the noise level is a measurement of sound generated by the air flowing into the passenger compartment in accordance with the one embodiment.

FIG. 3 is a chart showing sound levels measured in a plurality of air distribution settings at a plurality of airflow rates. The X-axis in FIG. 3 represents the rate of airflow measured in meters cubed per minute ($m^3/min.$). The Y-axis in FIG. 3 represents levels of noise in decibels (dBA or dB) produced by airflow into the passenger compartment of a vehicle measured at a location roughly corresponding to an ear of a vehicle operator or passenger.

More specifically, each curve on the chart in FIG. 3 represents the level of noise within a vehicle at various airflow rates, where the noise corresponds to the airflow out of an air handler of the HVAC system within that vehicle. The level of noise is not necessarily the sound of the blower motor producing the airflow, but rather is the amount noise produce by the airflow rushing out of the various air handler vents and duct openings within the passenger compartment. The sound of airflow rushing from air vents of an air handler into the passenger compartment of a vehicle can become very loud when the blower motor is operating at or close to its highest speed. In other words, the greater the airflow rate, the greater the level of noise produced within the vehicle by the airflow rushing out of the air handler.

As shown in FIG. 3, at a generally low airflow rate, for example at airflow rates of about 2.0 $m^3$/minute, the noise level is between 35 dBA and 40 dBA, depending upon the vehicle and duct airflow direction. However at a higher airflow rate, for example, an airflow rate of about 5.0 $m^3$/minute, the noise level is between 50 dBA and 60 dBA. Since the decibel scale is a logarithmic scale, a noise level of 60 dBA is exponentially greater than a noise level of 40 dBA. At 60 dBA, the noise level can make listening to the radio, having a discussion or talking on the telephone very difficult. Hence in a vehicle with a conventional HVAC system, in order to have a conversation or listen to the radio, the operator or passenger must manually decrease the airflow rate in order to reduce the noise level produce by the airflow into the passenger compartment, or speak very loud (or turn up the radio to a very loud volume).

Figure 4:
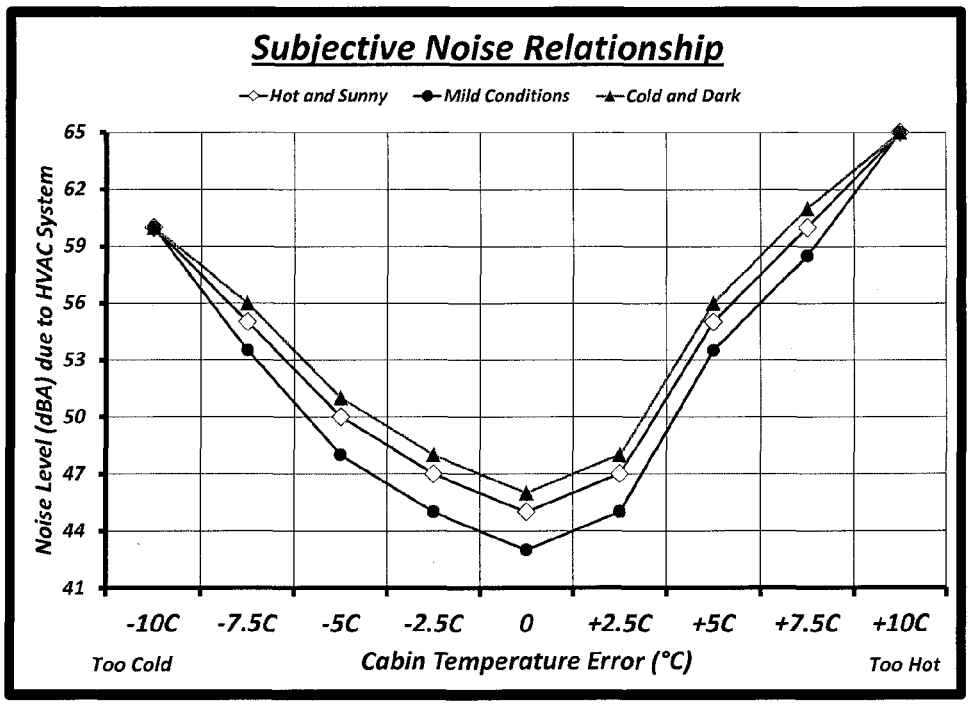
FIG. 4 is a chart showing a subjective representation of noise levels tolerated by an average vehicle operator/passenger correlated to temperature conditions within the passenger compartment in accordance with the one embodiment.

FIG. 4 shows subjective results of the tolerance of a vehicle operator and/or passenger to the HVAC noise levels at differing temperature conditions. The X-axis in FIG. 4 represents the difference between a desired temperature within the passenger compartment and the actual or measured temperatures within the passenger compartment. The Y-axis represents a noise tolerance level within the passenger compartment, where the noise is produced by the airflow into the passenger compartment.

These tests were subjective in nature in that each individual vehicle operator has their own preferences and ability to tolerate noise levels within a vehicle. The three curves in FIG. 4 represent differing conditions and averaged data that varied slightly from test subject to test subject. However, the subjective tests yielded consistent patterns of noise level tolerance. Specifically, the tolerance for the various noise levels changed with comfort level and conditions outside the vehicle. For example, when the passenger compartment is very cold, a vehicle operator or passenger typically tolerates a generally high level of noise from the airflow rate due to their desire to be warmer, as indicated on the left side of the graph in FIG. 4. Further, when the passenger compartment is very hot, the vehicle operator or passenger typically tolerates a generally high level of noise from the airflow rate due to their desire to be cooler. However, once a certain degree of comfort has been achieved, the tolerance for noise from airflow diminishes.

In FIG. 4, there are three data curves. Each resembles the letter V. The top data curve in FIG. 4 represents data collected in conditions where the ambient conditions (conditions outside the vehicle) were cold and dark (i.e., winter weather at night). The middle data curve in FIG. 4 represents data collected in hot and sunny weather conditions where there can be intense sunlight and the demand for cooling with a rapid airflow rate is desired by the operator or passenger. The bottom data curve in FIG. 4 represents data collected in mild weather conditions.

Clearly from the data in FIG. 4 one can conclude that as the temperature within the passenger compartment approaches the desired temperature set using the climate control panel within the passenger compartment, the tolerance for airflow noise levels decreases. For instance, when the difference between the measured temperature (within the passenger compartment) and the desired temperature is less than about ±2.5 degrees C., vehicle operators and passengers are willing to tolerate noise levels equal to or below approximately 47 dBA. However, when the difference between the measured temperature and the desired temperature is greater than ±5 degrees C., vehicle operators and passengers are willing to tolerate noise levels greater than approximately 50 dBA.

Consequently, as the passenger compartment temperature approaches the desired temperature, the vehicle operator's noise tolerance level decreases, showing that the airflow rate should be lowered.

In the description below, several variables are defined and described. For the sake of convenience, those variables are listed below:

- target temperature Tgt (desired temperature set by passenger/operator)
- current cabin temperatures Tr (temperature within passenger compartment measured by temperature sensor 42)
- airflow rate Q (i.e., determined by climate control logic in FIG. 8 in the automatic mode or can be manually set using climate control of instrument panel 24)
- operating airflow rate GA (determined by controller 14 and produced by the blower 16)
- ambient temperature Ta (temperature measured outside vehicle 10 by ambient temperature sensor 44)
- sun load indication Sun (detected by sunlight sensor 46)
- Noise Control Airflow Disable AFD (determined by controller 14)
- Noise Limit NL (determined by controller 14)
- Noise Level MN (determined by controller 14 or measured by microphone 48)
- Noise Control Setting NCL (ENABLED or DISABLED, determined by controller 14)

Figure 5:
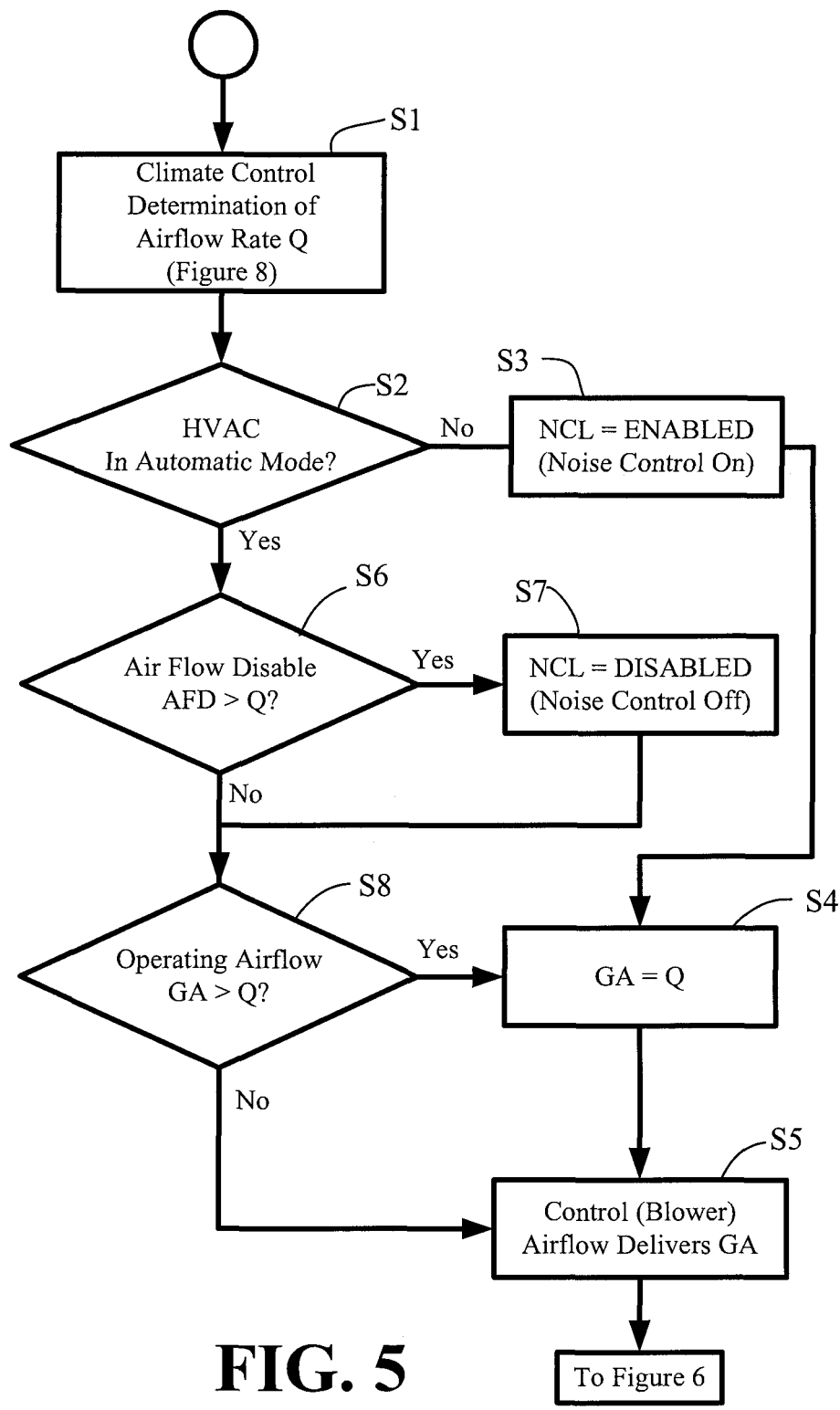
FIG. 5 is a first flowchart showing basic noise reduction operations of the controller operating in a noise reducing mode, in accordance with the one embodiment.
Figure 6:
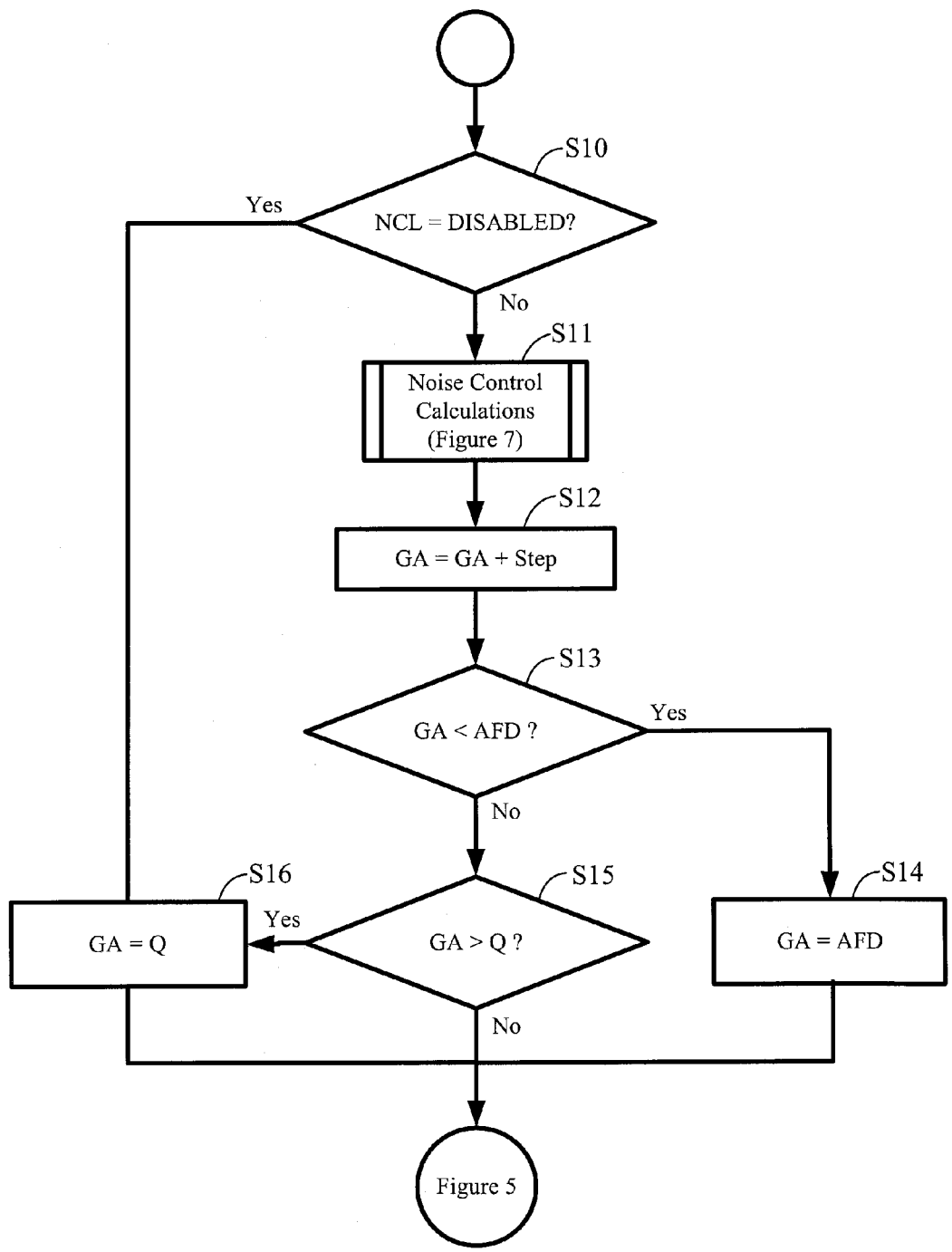
FIG. 6 is a second flowchart showing further basic noise reduction operations of the controller operating in the noise reducing mode, in accordance with the one embodiment.
Figure 7:
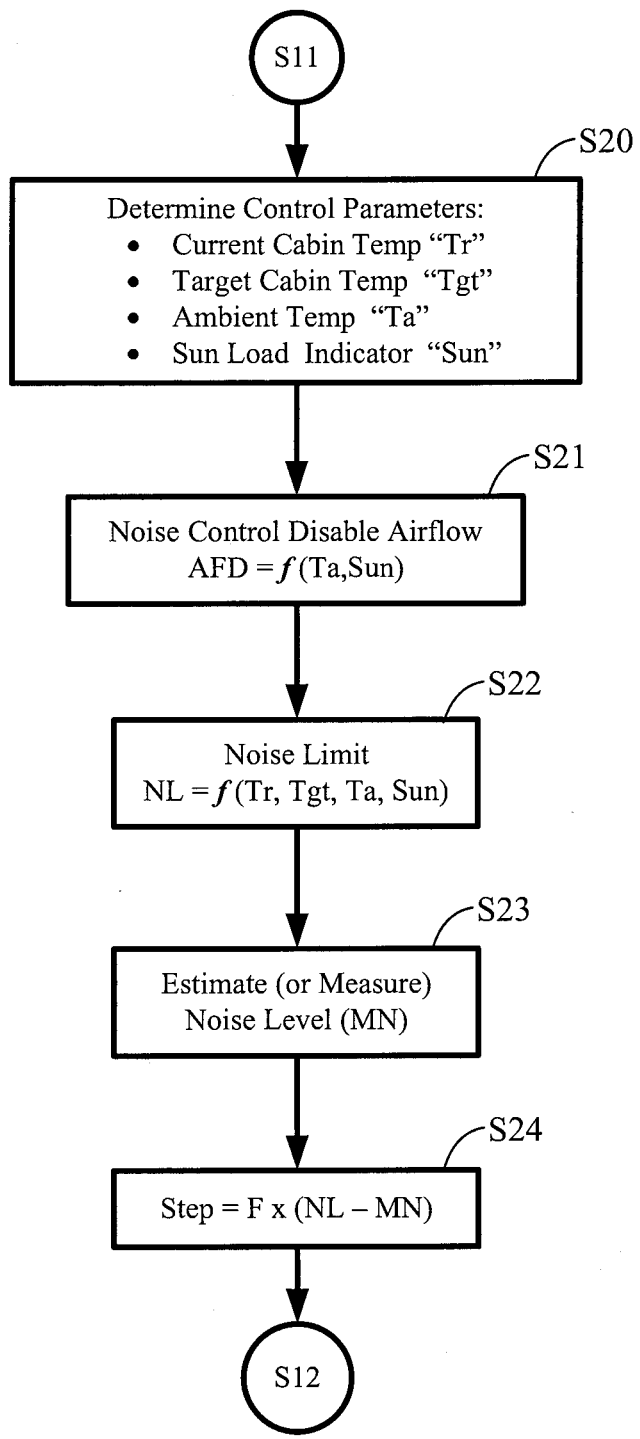
FIG. 7 is a third flowchart showing determinations of variables used in the noise reduction operations of the controller operating in the noise reducing mode, in accordance with the one embodiment.

A description of the operations of the controller 14 of the HVAC system 12 operating in the noise reducing mode is now provided with specific reference to FIGS. 5, 6 and 7. Although not shown in the flowcharts in FIGS. 5, 6 and 7, the controller 14 is configured to control the mixing door 38. Specifically, the controller 14 receives a setting from the climate controls of the instrument panel 24, indicating a desired temperature, or target temperature Tgt for the passenger compartment 18 as inputted by a passenger or vehicle operator. The controller 14 responds to inputting of the target temperature Tgt by comparing the target temperature Tgt to a current cabin temperature Tr within the passenger compartment 18, as measured by the temperature sensor 42. The controller 14 compares the current cabin temperature Tr with the target temperature Tgt and determines whether heating is needed or cooling is needed. Once this determination has been made, the controller 14 sends a signal to a motor that controls the position of the mixing door 38. The mixing door 38 is moved to an appropriate position at one of the heating position (solid lines in FIG. 2) and the cooling position (phantom lines in FIG. 2) or to an appropriate position therebetween, depending upon how large the difference is between the target temperature Tgt and the current cabin temperature Tr. Since control of the mixing door 38 is a conventional operation, further description is omitted for the sake of brevity.

The climate controls of the instrument panel 24 also permit the vehicle operator or vehicle passenger to manually set an airflow rate, which the controller 14 uses in order to establish an airflow rate Q (a climate control airflow rate Q), as described below. Initially, the airflow rate Q produced by the blower 16 can be set by the controller 14 as being equal to the airflow rate as set by the vehicle operator or vehicle passenger. The airflow control rate Q can be re-evaluated or initially set in the automatic mode, as described in the operations set forth in FIG. 8. Alternatively, upon startup of the HVAC system 12, the airflow rate Q can be a stored value calculated from the previous usage of the HVAC system 12. In other words, the airflow rate Q can be a previously determined value or can be manually inputted by a passenger or vehicle operator. As is explained below, the actual airflow rate produced by the blower 16 is preferably determined initially by the controller 14 in the automatic mode, as is described below with respect to FIG. 8. The airflow rate Q is also used by the controller 14 in the noise reducing mode in order to determine the variable operating airflow rate GA as is described below. The operating airflow rate GA is repeatedly adjusted by the controller 14 in response to various considerations, as outlined below. As is described below, the operating airflow rate GA can be defined by the controller 14 as being equal to the airflow rate Q. However, the value (or rate) of the operating airflow rate GA is continuously being evaluated and re-evaluated using the logic described below.

Upon initial start-up of the HVAC system 12, the controller 14 determines whether heating is need or cooling is needed and moves the mixing door 38 to an appropriate corresponding position. If the HVAC system 12 is programmed to purge the air handler 40 of moisture upon start-up, such purging procedures are conducted. The controller 14 can initially operate the blower 16 at a predetermined speed corresponding to the airflow rate Q entered by the vehicle operator or vehicle passenger (or stored in memory from the previous usage of the HVAC system 12), providing an initial airflow rate of air flowing into the passenger compartment 18.

Figure 8:
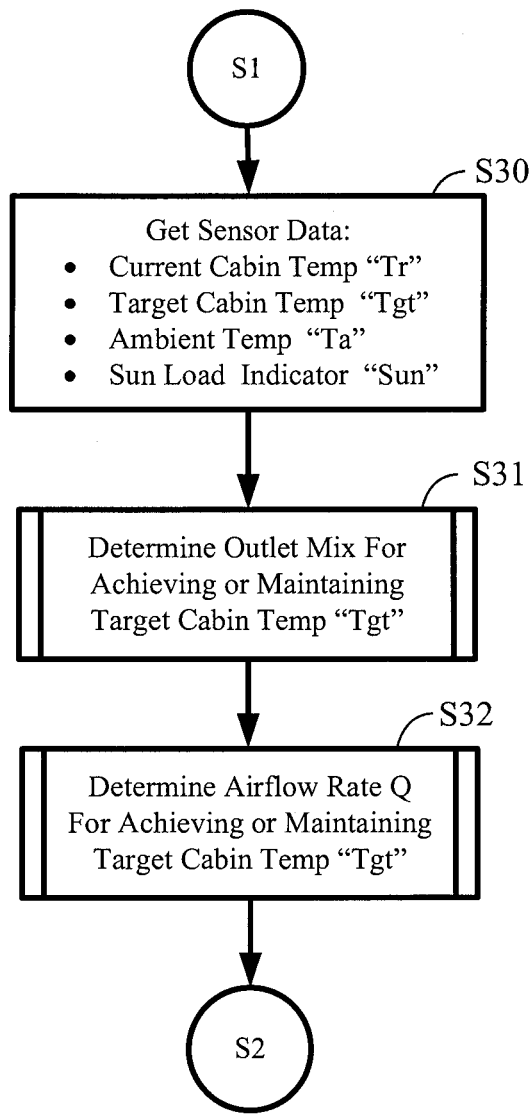
FIG. 8 is a flowchart showing determination of an airflow rate based on achieving and maintaining a target cabin temperature by the controller in an automatic mode in accordance with the one embodiment.

At step S1 in FIG. 5, the HVAC system 12 has started up and is operating to either cool or heat the passenger compartment 18. The climate control of the instrument panel 24 includes a button that activates an automatic mode operation of the HVAC system 12. The automatic mode is described below with respect to the flowchart in FIG. 8. The operations of the automatic mode outlined in FIG. 8 are conventional operations that include logic that controls the airflow rate of the blower 16 based on the objective of achieving the target cabin temperature Tgt. In the automatic mode of FIG. 8, the controller 14 reduces the airflow rate in response to changes in the current cabin temperatures Tr. The rate of the changes made to the airflow rate Q in the automatic mode is influenced by the ambient temperature Ta and the sun load indication Sun detected by the sunlight sensor 46. The controller 14 controls the blower 16 initially from the value of the airflow rate Q, set by the climate controls of the instrument panel 24 or from a value of the airflow rate Q stored in memory, but is re-evaluated and adjusted in the automatic mode, as described below with respect to the operations in FIG. 8. The airflow rate Q is a value that is measured in meters cubed per minute ($m^3$/min.). Typically, the airflow rate Q can be large upon initial startup in order to modify the current cabin temperature Tr within the passenger compartment 18 (measured by the temperature sensor 42) and strive to achieve the target temperature Tgt set by the vehicle operator or vehicle passenger as early as possible. Further, the automatic mode can include maintaining the blower 16 at a minimum speed (a reduced airflow rate) when heat is requested, but no heat is available yet from the propulsion system 22. In other words, in the automatic mode, if the engine is cold and no heat can be provided yet to the passenger compartment 18, the controller 14 delays implementation of a heating cycle until the engine has warmed up.

At step S2, the controller 14 determines whether or not the HVAC system is in the automatic mode. If the controller 14 determines that the HVAC system 12 is not in the automatic mode, then operation moves to step S3. If the HVAC system 12 is in the automatic mode, then operation moves to step S6.

At step S3 in FIG. 5, a variable NCL is defined and made equal to ENABLED (noise control is enabled and the controller 14 operates in the noise reducing mode). Thereafter operation moves to step S4, where the variable operating airflow rate GA, is defined as being equal to the airflow rate Q. In other words, whatever the value of Q is at that point in time, the controller 14 defines the operating airflow rate GA as being equal to the airflow rate Q. Thereafter, operation moves to step S5 where the controller 14 sets the blower 16 to operate at a predetermined speed that achieves the operating airflow rate GA. After step S5, operation moves to the steps depicted in FIG. 6, which are described below.

At step S6, the controller 14 determines whether or not a variable AFD (an airflow disable threshold) is greater than the climate control airflow rate Q. The variable AFD is defined in the calculations represented in step S11 in the flowchart depicted in FIG. 6 (corresponding to the steps in FIG. 7), as described in greater detail below. The variable AFD has units in meters cubed per minute ($m^3$/min.).

If AFD is greater than the airflow rate Q, then operation moves to step S7. If AFD is not greater than the airflow rate Q, then operation moves to step S8. At step S7, the variable NCL is made equal to DISABLED (noise control is DISABLED and the controller 14 does not operate in the noise reducing mode).

At step S8, the controller 14 determines whether or not the operating airflow rate GA is greater than the airflow rate Q. If the operating airflow rate GA is greater than airflow rate Q, operation moves to step S4, where the operating airflow rate GA is redefined as being equal to the airflow rate Q. If the operating airflow rate GA is not greater than the airflow rate Q, then operation moves to step S5, where the controller 14 sets the blower 16 to operate at a speed that achieves the operating airflow rate GA.

After step S5 in FIG. 5, control moves to the steps in the flowchart depicted in FIG. 6. At step S10, the controller 14 determines whether or not the variable NCL is equal to DISABLED. If the variable NCL is not equal to DISABLED, the operation moves to step S11. If the variable NCL is equal to DISABLED, operation moves to step S16, basically skipping the operations set forth in FIG. 6.

At step S11, noise control calculations and determinations are made by the controller 14. These noise control calculations and determinations include determining or calculating the noise control disable airflow variable AFD, the noise limit variable NL, a noise level MN (representing the noise level within the passenger compartment 18) and a variable "Step", as described below. These noise control calculations and determinations are described below with respect to FIG. 7, after completion of the description of the steps depicted in FIG. 6.

After completion of the noise control calculations and determinations in step S11, operation moves to step S12, where the operating airflow rate GA is redefined as being equal to the current value of the operating airflow rate GA plus the "Step" that was calculated in the noise control calculations and determinations in step S11 (and in FIG. 7). The operating airflow rate GA will not be set to a rate below the value of AFD due to the adjustment made in step S12. Operation then moves to step S13 where the controller 14 determines whether or not the operating airflow rate GA is less than AFD. Step S13 ensures that the operating airflow rate GA will not be less than AFD.

Hence, if the operating airflow rate GA is less than AFD in step S13, operation moves to step S14 where the operating airflow rate GA is made equal to AFD. After step S14, operation leaves FIG. 6 and returns to FIG. 5 for a next iteration of the logic.

However, if the operating airflow rate GA is not less than AFD, then operation moves to step S15. At step S15, the controller determines whether or not the operating airflow rate GA is greater than the airflow rate Q entered by the vehicle operator or passenger (or the result of the automatic mode calculation). If the operating airflow rate GA is greater than the airflow rate Q, then operation moves to step S16. If the operating airflow rate GA is not greater than the airflow rate Q, then operation leaves FIG. 6 and returns to FIG. 5 for a next iteration of the logic.

At step S16, the operating airflow rate GA is made equal to the airflow rate Q. Thereafter, operation leaves FIG. 6 and returns to FIG. 5 for a next iteration of the logic with the controller 14 adjusting the speed of the blower 16 in step S5 in FIG. 5 in response to the iteration of the steps in FIGS. 5-8, such that the blower 16 delivers air to the passenger compartment 18 at the determined airflow rate (the operating airflow rate GA).

A description of the logic set forth in FIG. 7 is now provided. FIG. 7 shows the noise control calculations and determinations referenced at step S11 in FIG. 6.

At step S20, the controller 14 retrieves the measurements from the various sensors within the vehicle. Specifically, the controller 14 retrieves: the current cabin temperature Tr from the temperature sensor 42; the target cabin temperature Tgt from the climate control of the instrument panel 24; the ambient temperature Ta from the ambient temperature sensor 44; and the sun load indication Sun detected by sunlight sensor 46.

Next at step S21, the controller 14 evaluates the ambient temperature Ta and the sun load indication Sun, and uses them to determine the value of the variable AFD (the airflow disable threshold). AFD is determined based on, for example, data tabulated for the HVAC system 12. This data is tabulated on the right side of Table 1 below. There are two columns at the right side of Table 1, the column with "Dark" above it corresponds to an indication that it is night or conditions are such that sunlight is not being detected in any appreciable amounts by the sunlight sensor 46. The column with 1 kW/$m^2$ corresponds to intense sunlight being detected by the sunlight sensor 46.

Table 1, below, also includes tabulated data used for determining the Noise limit NL in step S22. The tabulated data in Table 1 is based on, for example, the subjective data shown in FIG. 4, where passenger and vehicle operator noise preferences were evaluated, the particular acoustic responses of the passenger compartment 18 and corresponding noise levels of the HVAC system 12 at the associated airflow rates. However, it should be understood from the drawings and the description herein that the data tabulated in Table 1 is for a specific HVAC system and includes subjective information based on information from passengers and vehicle operators. Therefore, the data presented in Table 1 is one example of such data. In other words, a tabulation of data such as that shown in Table 1, can be tabulated for each vehicle and corresponding HVAC system and differing groups of vehicle operators and passengers. It should be understood from the drawings and the description herein that the data in Table 1, while subjective, shows a basic arrangement of numbers that are not likely change by an appreciable amount from vehicle to vehicle.

TABLE 1

| | | Noise Level NL In Dark (dBA) Cabin Temperature minus Target Temperature | | | | | | | | AFD Airflow Limit (AFD) | |
|---|---|---|---|---|---|---|---|---|---|---|---|
| | | −10 C. | −7.5 C. | −5 C. | −2.5 C. | 0 | +2.5 C. | +5 C. | +7.5 C. | +10 C. | Dark | 1 kW/m² |
| Ambient Temp. | −20 | 66 | 56.5 | 51 | 48 | 46 | 48 | 56.5 | 61.5 | 65 | 5.2 | 5.2 |
| | −15 | 66 | 56 | 50.5 | 47.5 | 45.5 | 47.5 | 56 | 61 | 65 | 5 | 5 |
| | −10 | 66 | 55.5 | 50 | 47 | 45 | 47 | 55.5 | 60.5 | 65 | 4.8 | 4.8 |
| | −5 | 65 | 55 | 49.5 | 46.5 | 44.5 | 46.5 | 55 | 60 | 65 | 4.6 | 4.6 |
| | 0 | 64 | 54.5 | 49 | 46 | 44 | 46 | 54.5 | 59.5 | 65 | 4.3 | 4.3 |
| | 5 | 63 | 54 | 48.5 | 45.5 | 43.5 | 45.5 | 54 | 59 | 65 | 4.1 | 4.1 |
| | 10 | 62 | 53.5 | 48 | 45 | 43 | 45 | 53.5 | 58.5 | 65 | 3.9 | 3.9 |
| | 15 | 61 | 53.5 | 48 | 45 | 43 | 45 | 53.5 | 58.5 | 65 | 3.2 | 3.2 |
| | 20 | 60 | 53.5 | 48 | 45 | 43 | 45 | 53.5 | 58.5 | 65 | 2.7 | 3.7 |
| | 25 | 61 | 53.5 | 48 | 45 | 43 | 45 | 53.5 | 58.5 | 65 | 2.5 | 4 |
| | 30 | 62 | 53.5 | 48 | 45 | 43 | 45 | 53.5 | 58.5 | 65 | 2.4 | 4.4 |
| | 35 | 63 | 54.5 | 49 | 46 | 44 | 46 | 54.5 | 59.5 | 66 | 2.5 | 4.5 |
| | 40 | 64 | 55.5 | 50 | 47 | 45 | 47 | 55.5 | 60.5 | 67 | 2.6 | 4.6 |
| | 45 | 65 | 56.5 | 51 | 48 | 46 | 48 | 56.5 | 61.5 | 68 | 3 | 5 |

Returning to step S21, the controller 14 determines the variable AFD by using the ambient temperature Ta and comparing it to the temperatures listed on the left most column of data in Table 1, and then looking up the corresponding entries in the two columns at the right side of Table 1. If, for example, the ambient temperature Ta is 30° C., the row of data corresponding to the ambient temperature Ta being 30° C. is applied. The two entries in the right side columns in Table 1 at 30° C. are 2.4 m³/min (dark—no sunlight) and 4.4 m³/min (with intense sunlight detected). If the sun load indication Sun measured by the sunlight sensor 46 returns a value of 0.5 kW/m² (the value of the variable Sun is 0.5 kW/m²), then the controller 14 performs a linear interpolation. 0.5 kW/m² is exactly half the value 1.0 kW/m². Therefore, the value of AFD is midway between the two entries in the right side columns in Table 1 at 30° C. are 2.4 m³/min (dark—no sunlight) and 4.4 m³/min. More specifically, the value of AFD is 3.4 m³/min. It should be understood that the sunlight sensor 46 can be calibrated to give a maximum value of 1.0 kW/m² in bright sunlight and a value of 0.0 kW/m² in total darkness. However the actual output from the sunlight sensor 46 can be outside the range indicated herein. For example, the output of the sunlight sensor 46 can be calibrated to be greater than 1.0 kW/m², in which case the values from Table 1 can be revised accordingly, or extrapolation can be made to accommodate higher levels of output from the sunlight sensor 46. Alternatively, the maximum value of 1.0 kW/m² in Table 1 can be modified depending upon the calibration of the sunlight sensor 46 and the capacity of the HVAC system 12 relative to the vehicle 10. In other words, the data tabulated in Table 1 is one example of such data. The data in Table 1 can vary from vehicle design to vehicle design and HVAC system to HVAC system.

Another way of understanding this interpolation is to determine the value of AFD mathematically as follows, the "Dark" (no-sun) look-up value is found based on the ambient temperature Ta. Thereafter, the value of variable Sun, as measured by the sunlight sensor 46, is used to determine a Slope using the equation below.

Slope=((Value of AFD at 1 kW/m²)−(Value of AFD at "Dark"))/(1 kW/m²)

In the example above, (Value of AFD at 1 kW/m²)=2.4 m³/min at 30° C. The (Value of AFD at "Dark")=at 4.4 m³/min. Therefore the slope=2 (m³/min)/(kW/m²).

The final value of the variable AFD, based on interpolation, is calculated with the equation below:

AFD=(Slope×"Sun")+(Value of AFD at "Dark")

Therefore:

AFD=(2(m³/min)/(kW/m²)×(0.5 kW/m²))+(2.4 m³/min)=3.4 m³/min

The value of Sun measured by the sunlight sensor 46 is 0.5 kW/m². The AFD is calculated as (2 (m³/min)/(kW/m²)× 0.5 m³/min) plus 2.4 m³/min, which is equal to 3.4 m³/min.

At step S22, the controller 14 also uses the data in Table 1 to determine the noise limit NL. First, ambient temperature Ta is used to identify the corresponding row of data. In the example above, Ta was equal to 30° C. Next the difference between the current cabin temperature Tr and the target temperature Tgt is determined. For this example, the difference between Tr and Tgt is 0° C. Therefore, from Table 1, the entry corresponding to these two temperatures for a preliminary value for the noise limit NL is 43. However, the controller 14 further uses the following equation to fine tune noise limit NL:

NL=Table result+("Sun"×(Sunload Noise Adjustment))

where the Sunload Noise Adjustment is a predetermined value equal to 1.5 dBA/(kW/m²). Therefore, the variable noise limit NL is equal to the 43 (from Table 1), plus the product of the reading from the sunlight sensor 46 and the Sunload Noise Adjustment, or NL=43+(0.5 kW/m²×(1.5 dBA/(kW/m²))=43.75 dBA Next at step S23 in FIG. 7, the controller 14 determines the variable noise level MN, which represents the noise level due to airflow within the passenger compartment 18. As mentioned above, the vehicle 10 and the HVAC system 12 can be provided with the microphone 48 that measures the noise level due to the rate of the airflow into the passenger compartment 18. However, alternatively, the controller 14 can be provided with tabulated data that includes previously measured noise levels for the HVAC system 12, where noise levels were measured at various airflow rates. Such data includes the speed of the blower 16, the airflow rate corresponding to each speed of the blower 16 and a measured value of noise from the airflow flowing into the passenger compartment 18. It should be understood from the drawings and the description herein, that for each vehicle and each differing HVAC system where there is no microphone 48, a separate set of tabulated data is constructed for use in determining the noise level MN (measured noise).

Therefore, at step S23, if the microphone 48 is present, the controller 14 obtains the current value of MN (measured noise) from the microphone 48. If no microphone is present in the HVAC system 12, then the controller 14 looks up a corresponding value of MN based upon the speed of the blower 16 and the air distribution setting.

At step S24, the controller 14 determines the value of the variable "Step" subsequently used in adjusting the operating airflow rate GA in step S12 in FIG. 6. The controller 14 calculates the value of "Step" using step factor F with a predetermined value of 0.1 (m$^3$/min)/dBA. The controller 14 uses the equation below to calculate the value of "Step" as follows:

$$Step=F\times(NL-MN)$$

where NL is determined in step S22 and MN is determined in step S23.

After the noise control calculations are made in the steps in FIG. 7, operation returns to step S12 in FIG. 6. The controller 14 repeats the steps in FIGS. 5-7 as long as the HVAC system 12 continues to operate. Since the logic includes repeated checks of manual input of blower speed in step S1 in FIG. 5, it is possible for a vehicle operator or passenger to change the airflow rate of air into the passenger compartment 18. However, the repeated iterations of the steps in FIGS. 5-7 will eventually return the airflow rate to a level that reduces noise levels within the passenger compartment 18. The adjustment logic timing takes about 15 seconds per iteration in the depicted embodiment.

Figure 9:
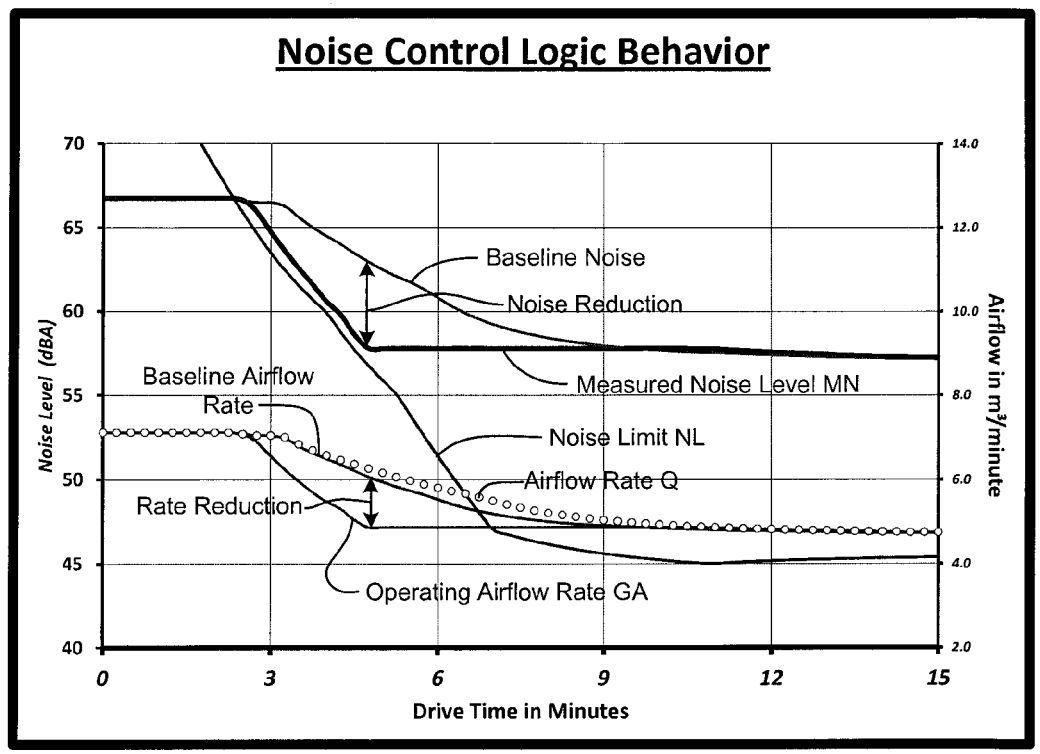
FIG. 9 is a graph showing noise level and airflow rate related data collected during the operation of the HVAC system while cooling the passenger compartment using the logic set forth in the flowcharts in FIGS. 5-7 in the noise reducing mode, along with baseline data based on the determinations made in the operations in FIG. 8 in the automatic mode, in accordance with the one embodiment.

FIGS. 8 and 9 are graphs showing noise level and airflow rate related data (FIG. 8) and temperature and airflow rate related data (FIG. 9) collected during the operation of the HVAC system while cooling the passenger compartment using the logic set forth in the flowcharts in FIGS. 5-7, along with baseline data. The data in FIGS. 8 and 9 show data collected over the first fifteen minutes of operation of the HVAC system 12. Specifically, FIG. 8 shows lines representing the values of the following during iterations of the logic set forth in FIGS. 5-7: the calculated noise limit NL, as determined in step S22 of FIG. 7; the airflow rate Q as set by the climate control of the instrument panel 24; the noise level MN within the passenger compartment 18, as measured by the microphone 48; and the calculated operating airflow rate GA, as implemented by the controller 14 at FIG. 5 at step S5.

A description of the operation of an HVAC system 12 in an automatic mode is now described with respect to FIG. 8. The automatic mode of operation of the HVAC system 12 reduces the speed of the blower 16, and hence reduces the airflow rate Q, based on the desire to achieve the target temperature Tgt set by the operator or passenger. The logic described above with respect to FIGS. 5-7, continuously adjusts the speed of the blower 16 reducing the operating airflow rate GA to achieve a more comfortable noise level within the vehicle 10.

FIG. 8 shows operation of the controller 14 in the automatic mode. The basic steps of the automatic mode are conventional. Examples of operation in an automatic mode are set forth in, for instance, U.S. Pat. No. 5,832,990, U.S. Pat. No. 5,995,889 and U.S. Pat. No. 6,782,945, all commonly assigned and having common inventorship. U.S. Pat. No. 5,832,990, U.S. Pat. No. 5,995,889 and U.S. Pat. No. 6,782,945, are all incorporated herein by reference in their entirety.

In step S30 in FIG. 8, the controller 14 retrieves sensor data. Specifically, the controller 14 retrieves: the current cabin temperature Tr from the temperature sensor 42; the target cabin temperature Tgt from the climate control of the instrument panel 24; the ambient temperature Ta from the ambient temperature sensor 44; and the sun load indication Sun detected by sunlight sensor 46.

At step S31, using the data collected in step S30, the controller 14 determines a position for the mixing door 38 to facilitate appropriate heating or cooling. The logic used to determine the position for the mixing door 38 is conventional, as set forth in, for example, any of U.S. Pat. No. 5,832,990, U.S. Pat. No. 5,995,889 and U.S. Pat. No. 6,782,945.

At step S32, again using the data collected in step S30, the controller 14 determines whether or not changes are necessary to the airflow rate Q in response to the difference between the target cabin temperature Tgt and the current cabin temperature Tr. The amount of change to the airflow rate Q is influenced by the ambient temperature Ta and the sun load indication Sun (if present). Again, the logic used can be based on the operations set forth in any one of U.S. Pat. No. 5,832,990, U.S. Pat. No. 5,995,889 and U.S. Pat. No. 6,782,945. No consideration is given to the noise level of the blower 16 and the sounds of the rushing of air into the passenger compartment 18. The primary focus of the logic used in steps S30 through S32 is to achieve the target cabin temperature Tgt within the passenger compartment 18. Any reductions to the airflow rate Q are made only as the difference between the target cabin temperature Tgt and the current cabin temperature Tr falls to a predetermined level. Changes made to the airflow rate Q in step S32 are gradual, as shown in FIGS. 9 and 10.

After step S32, operation returns to the logic in FIG. 5 at step S2.

Figure 10:
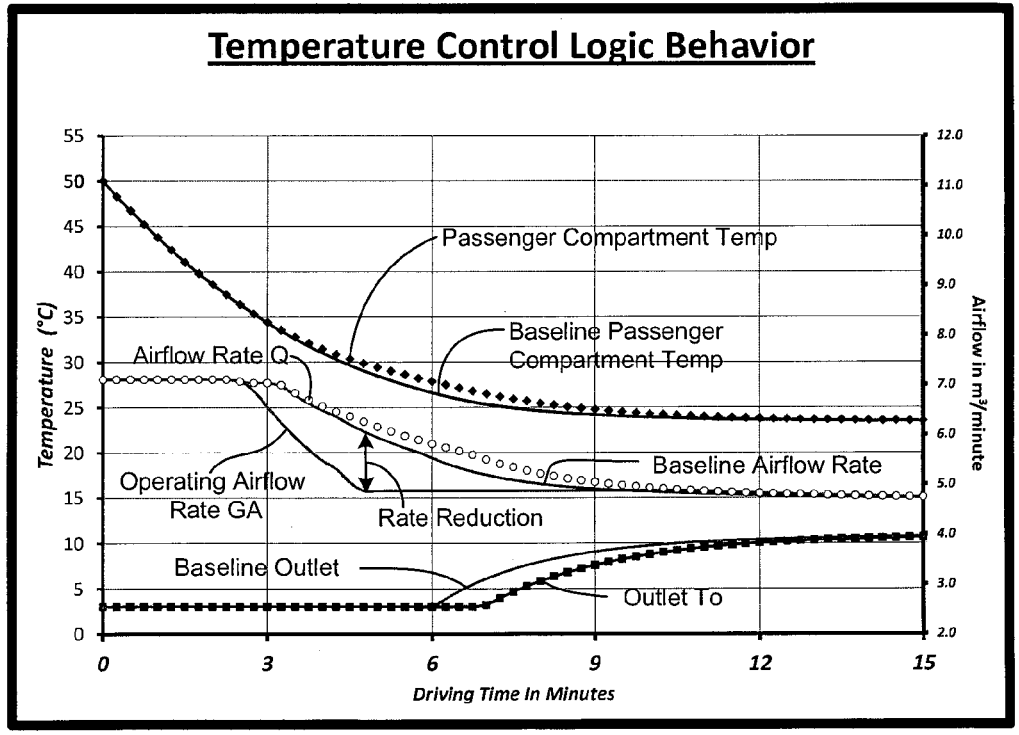
FIG. 10 is another graph showing temperature and airflow rate related data collected during the operation of the HVAC system while cooling the passenger compartment using the logic set forth in the flowcharts in FIGS. 5-7 in the noise reducing mode, along with baseline data based on the determinations made in the operations in FIG. 8 in the automatic mode, in accordance with the one embodiment.

FIGS. 9 and 10 also include baseline data that basically corresponds to operation of the HVAC system 12 in the automatic mode, and provides a contrast to the noise reducing operations represented in FIGS. 5-7. In other words, the automatic mode of the HVAC system 12 is based upon the desire to achieve the target cabin temperature Tgt (set using the climate controls of the instrument panel 24). The airflow rate Q of the HVAC system 12 in the automatic mode is identified in FIGS. 9 and 10 as the "Baseline Airflow Rate". Measured noise within the HVAC system 12 operating in the automatic mode is identified as "Baseline Noise" in FIGS. 9 and 10. Further a "Baseline Airflow Rate" was further measured or determined for the HVAC system 12 operating in the automatic mode and is shown in FIGS. 8 and 9.

A visual comparison between the operating airflow rate GA of the HVAC system 12 operating in the noise reducing mode and the baseline airflow rate of the HVAC system 12 in the automatic mode shown in FIGS. 9 and 10, reveals an airflow rate reduction. Further, a comparison between the "Baseline Noise" of the HVAC system 12 in the automatic mode and the measured noise level MN of the HVAC system 12 operating in the noise reducing mode shows that the HVAC system 12 in the automatic mode takes longer to reduce the overall noise level within the passenger compartment 18 than the HVAC system 12 operating in the noise reducing mode. Further, as shown in FIG. 9, there is a significant noise reduction in the passenger compartment 18 in the noise reducing mode as compared to the automatic mode. This noise reduction at its maximum (marked in FIG. 9 with a large arrow at a point about 5 minutes into the operation process) represents a noise reduction of approximately 10 dBA.

FIG. 10 also shows that during the depicted cool down event, an outlet temperature To of the HVAC system 12 in the noise reducing mode remains at a lower temperature longer than the baseline outlet temperature of the automatic mode. Specifically, the baseline outlet temperature begins to rise at six minutes into the depicted cycle. The outlet temperature To remains at the depicted temperature until about seven minutes into the depicted event. The outlet temperature To is lower than the baseline outlet temperature from about six minutes into the depicted cycle until about 11 minutes into the depicted event. This temperature differential is due to the controller 14 compensating for the reduced airflow rate by maintaining the outlet temperature To at a reduced level in order to achieve the target temperature Tgt.

It should be understood from the drawings and the description herein that the values in Table 1 can be modified to achieve differently shaped data curve from those depicted in FIGS. 9 and 10. For example, the values set in Table 1 can be used to make noise control a higher priority than achieving the target temperature within the passenger compartment 18. Further, in alternative embodiments, a table such as Table 1 can be provided for the heating cycle (cold weather) and a second table provided for the cooling cycle (hot weather).

Figure 11:
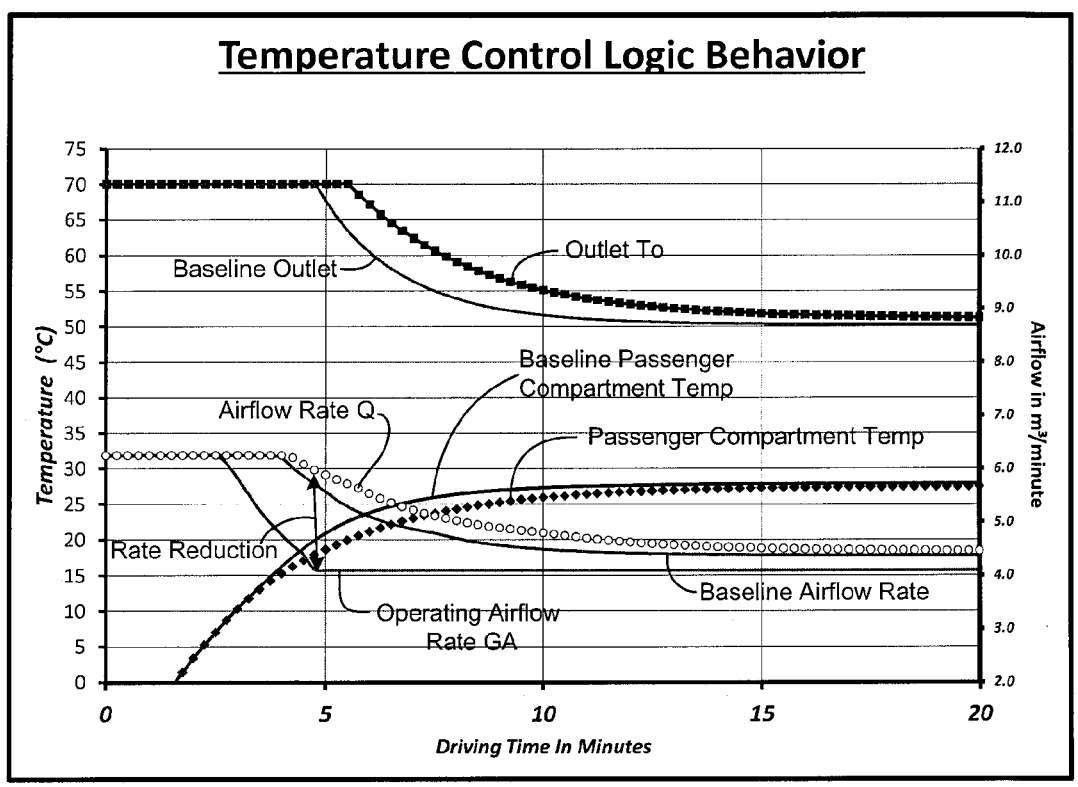
FIG. 11 is another graph showing temperature and airflow rate related data collected during the operation of the HVAC system while heating the passenger compartment using the logic set forth in the flowcharts in FIGS. 5-7, along with baseline data based on the determinations made in the operations in FIG. 8 in the automatic mode, in accordance with the one embodiment.

FIG. 11 represents heating (cold weather) and includes a graph showing temperature and airflow rate related data collected during the operation of the HVAC system while heating the passenger compartment using the logic set forth in the flowcharts in FIGS. 5-7 operating in the noise reducing mode, along with baseline data of the automatic mode. The noise level and airflow rate related data for heating operations are not depicted because they are similar to the data depicted in FIG. 9. As shown in FIG. 11, the HVAC system 12 operating in the noise reducing mode exhibits an airflow rate reduction (labeled "Rate Reduction" in FIG. 11) that corresponds to a noise reduction similar to that in the cooling operation depicted in FIG. 9.

As is demonstrated in FIGS. 9, 10 and 11, the noise reducing mode described above still achieves a comfort level within the passenger compartment 18 by reducing the level of noise produced by the airflow generated by the blower 16. However, the target cabin temperature Tgt is still achieved and maintained in the noise reducing mode.

The controller 14 preferably includes a microcomputer with an HVAC system control program that controls the HVAC system 12. The controller 14 can also include other conventional components such as an input interface circuit, an output interface circuit, and storage devices such as a ROM (Read Only Memory) device and a RAM (Random Access Memory) device. The microcomputer of the controller 14 is programmed to control the HVAC system 12. The memory circuit stores processing results and control programs such as ones for HVAC operation that are run by the processor circuit. The controller 14 is operatively coupled to the components and sensors of the HVAC system 12 in a conventional manner. The internal RAM of the controller 14 stores statuses of operational flags and various control data. The internal ROM of the controller 14 stores the HVAC commands for various operations. The controller 14 is capable of selectively controlling any of the components of the control system of the HVAC system 12 in accordance with the control program. It will be apparent to those skilled in the art from this disclosure that the precise structure and algorithms for the controller 14 can be any combination of hardware and software that will carry out the functions of the present invention.

The various elements of the vehicle 10 and the HVAC system 12 (other than the controller 12) are conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle HVAC system. Accordingly, these terms, as utilized to describe the present invention should be interpreted relative to a vehicle equipped with the vehicle HVAC system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle HVAC noise control system comprising:
an air handler providing airflow to a passenger compartment, the air handler including a heating source and a cooling source;
an inputting device that sets a target temperature for the passenger compartment;
a temperature sensor that measures a current temperature within the passenger compartment;
at least one exterior sensor that detects an ambient condition outside of the passenger compartment;
a blower motor operably connected to the air handler moving the air flowing through the air handler into the passenger compartment at an adjustable operating airflow rate; and
a controller operatively connected to the air handler, the inputting device, the temperature sensor, the at least one exterior sensor, and the blower motor, the controller determining and implementing adjustments to the operating airflow rate in order to reduce airflow based on at least the ambient condition detected outside of the passenger compartment, a comparison between the target temperature and the current temperature within the passenger compartment and a noise level of the airflow in the passenger compartment,
the controller further determines a value of a noise control disable airflow variable based upon at least the ambient condition and the comparison between the target temperature and the current temperature within the passenger compartment, and
the controller further determines whether or not to implement adjustments to the operating airflow rate in response to a comparison between an airflow rate inputted to the inputting device and a noise control disable airflow variable.

2. The vehicle HVAC noise control system according to claim 1, wherein
the at least one exterior sensor includes a temperature sensor, and
the ambient condition is an ambient temperature measured outside the passenger compartment by the temperature sensor.

3. The vehicle HVAC noise control system according to claim 2, further comprising
a sound detector within the passenger compartment that detects the noise level of the airflow, and wherein
the controller is further operatively connected to the sound detector and further determines the adjustments to the operating airflow rate based on the noise level detected by the sound detector.

4. The vehicle HVAC noise control system according to claim 3, wherein
the controller further determines a noise limit based on at least the current temperature, the target temperature and the ambient temperature, and
the controller further determines the adjustments to the operating airflow rate based on a comparison between the noise limit and the noise level of the airflow.

5. The vehicle HVAC noise control system according to claim 2, wherein
the controller includes noise level correlation data that correlates estimated noise levels of various airflow rates with corresponding speeds of the blower motor, the controller using the noise level correlation data to determine the noise level of the airflow, and
the controller further determines the adjustments to the operating airflow rate based on the estimated noise levels at a corresponding one of the various airflow rates.

6. The vehicle HVAC noise control system according to claim 2, wherein
the at least one exterior sensor further includes a sunlight detecting sensor that measures an amount of sunlight outside the passenger compartment defining a second ambient condition outside the passenger compartment.

7. The vehicle HVAC noise control system according to claim 6, further comprising
a sound detector within the passenger compartment that detects the noise level of the airflow, and wherein
the controller is further operatively connected to the sound detector and further determines the adjustments to the operating airflow rate based on the noise level of the airflow detected by the sound detector.

8. The vehicle HVAC noise control system according to claim 7, wherein
the controller further determines a noise limit based on at least the current temperature, the target temperature, the ambient temperature and the amount of sunlight outside of the passenger compartment, and
the controller further determines the adjustments to the operating airflow rate based on a comparison between the noise limit and the noise level of the airflow.

9. The vehicle HVAC noise control system according to claim 6, wherein
the controller includes noise level correlation data that correlates estimated noise levels of various airflow rates with corresponding speeds of the blower motor, the controller using the noise level correlation data to determine the noise level of the airflow, and
the controller further determines the adjustments to the operating airflow rate based on the estimated noise levels at a corresponding one of the various airflow rates.

10. The vehicle HVAC noise control system according to claim 9, wherein
the controller further determines a noise limit based on at least the current temperature, the target temperature and the ambient condition outside of the passenger compartment, and
the controller further determines the adjustments to the operating airflow rate based on a comparison between the noise limit and the estimated noise level.

11. The vehicle HVAC noise control system according to claim 1, wherein
the at least one exterior sensor includes a sunlight detecting sensor, and
the ambient condition is an amount of sunlight measured outside the passenger compartment by the sunlight detecting sensor.

12. The vehicle HVAC noise control system according to claim 1, further comprising
a sound detector within the passenger compartment that detects the noise level of the airflow, and wherein
the controller is further operatively connected to the sound detector and further determines the adjustments to the operating airflow rate based on the noise level detected by the sound detector.

13. The vehicle HVAC noise control system according to claim 12, wherein
the controller further determines a noise limit based on at least the current temperature, the target temperature and the ambient condition outside of the passenger compartment, and
the controller further determines the adjustments to the operating airflow rate based on a comparison between the noise limit and the noise level of the airflow.

14. The vehicle HVAC noise control system according to claim 1, wherein
the controller includes noise level correlation data that correlates estimated noise levels of various airflow rates with corresponding speeds of the blower motor, the controller using the noise level correlation data to determine the noise level of the airflow, and
the controller further determines the adjustments to the operating airflow rate based on the estimated noise levels at a corresponding one of the various airflow rates.

15. The vehicle HVAC noise control system according to claim 14, wherein
the controller further determines a noise limit based on at least the current temperature, the target temperature and the ambient condition outside of the passenger compartment, and
the controller further determines the adjustments to the operating airflow rate based on a comparison between the noise limit and the estimated noise level.

16. The vehicle HVAC noise control system according to claim 1, wherein
the heating source is a heat exchanger operably coupled to the air handler selectively heating the air flowing through the air handler to the passenger compartment; and
the cooling source is an AC evaporator operably coupled to the air handler selectively cooling air flowing through the air handler into the passenger compartment.

17. A vehicle HVAC noise control system comprising:
an air handler providing airflow to a passenger compartment, the air handler including a heating source and a cooling source;
an inputting device that sets a target temperature for the passenger compartment;
a temperature sensor that measures a current temperature within the passenger compartment;
an ambient temperature sensor positioned to detect ambient temperature outside of the passenger compartment;
a sunlight sensor that detects sunlight conditions outside of the passenger compartment;
a blower motor operably connected to the air handler moving the air flowing through the air handler into the passenger compartment at an adjustable operating airflow rate;
a sound detector within the passenger compartment that detects the noise level of the airflow, and
a controller operatively connected to the air handler, the inputting device, the temperature sensor, the ambient temperature sensor, the sunlight sensor, the sound detector and the blower motor, the controller being configured to determine a step value Step and implement adjustments to the operating airflow rate produced by the blower motor by an amount equal to the step value Step, the step value Step being determined as follows:

$$Step = F \times (NL-MN)$$

where
F is a predetermined fixed value;
NL is a variable determined based on the current temperature within the passenger compartment, the target temperature set by the inputting device, ambient temperature and a current reading from the sunlight sensor; and
MN is an amount of measured noise detected by the sound detector.

* * * * *